US005926002A

United States Patent [19]

Cavanaugh et al.

[11] Patent Number: 5,926,002

[45] Date of Patent: Jul. 20, 1999

[54] PENDENT WITH SAFETY FEATURES FOR PATIENT HANDLING APPARATUS

[75] Inventors: Matthew R. Cavanaugh, Victor; Kenneth A. Johnson, Walworth, both of N.Y.

[73] Assignee: Getinge/Castle, Inc., Rochester, N.Y.

[21] Appl. No.: 08/391,713

[22] Filed: Feb. 21, 1995

Related U.S. Application Data

[51] Int. Cl.$^{6}$ .................................................... G05B 11/14

[52] U.S. Cl. .......................... 318/672; 318/671; 318/484; 5/600; 5/618; 297/284.3

[58] Field of Search ............................... 5/600, 601, 613, 5/614, 615, 616, 617, 618, 60, 66, 57, 63, 65, 64, 453, 658; 318/484, 16, 37, 626, 280, 672, 281, 671; 297/284, 284.3

[56] References Cited

U.S. PATENT DOCUMENTS

| | | | |
|---|---|---|---|
| 3,913,153 | 10/1975 | Adams et al. | 5/618 |
| 4,094,024 | 6/1978 | Benoit et al. | 5/616 |
| 4,183,015 | 1/1980 | Drew et al. | 340/825.06 |
| 4,247,091 | 1/1981 | Golwacki et al. | 5/618 |
| 4,418,334 | 11/1983 | Burnett | 340/332 |
| 4,431,154 | 2/1984 | Hamm | 248/215 |
| 4,435,862 | 3/1984 | King et al. | 5/66 |
| 4,472,845 | 9/1984 | Chivetta et al. | 5/616 |
| 4,680,790 | 7/1987 | Packard et al. | 5/60 |
| 4,780,919 | 11/1988 | Harrison | 5/600 |
| 4,833,614 | 5/1989 | Saitoh et al. | 297/284 |
| 4,935,968 | 6/1990 | Hunt et al. | 5/453 |
| 5,240,011 | 8/1993 | Assa | 128/751 |
| 5,255,403 | 10/1993 | Oritz | 5/503.1 |
| 5,415,169 | 5/1995 | Siczek et al. | 128/653 |
| 5,462,515 | 10/1995 | Tseng | 601/57 |
| 5,540,651 | 7/1996 | Risch et al. | 601/148 |
| 5,542,138 | 8/1996 | Williams et al. | 5/658 |
| 5,628,078 | 5/1997 | Pennington et al. | 5/618 |

OTHER PUBLICATIONS

Quantum™ 3080RC Surgical Table brochure, TC–900, copyrighted to AMSCO in 1989 (Feb. 1989).

Ad slick for Quantum 3080 SP, copyrighted by AMSCO in 1993, TC–1000, 2M, GPS, Mar. 1993, GA–2r.

*Primary Examiner*—John W. Cabeca
*Attorney, Agent, or Firm*—Phillips, Lytle, Hitchcock, Blaine & Huber LLP

[57] ABSTRACT

The application describes a control pendant for controlling a multi-segment patient table to assume a variety of different positions or configurations. The pendant has safety features including automatic shutoff of power to the keys under selected conditions and backlighting of the keys when power is being supplied (e.g., when keys are operational) to provide improved visibility in low-light environments. The control pendant further has an ergonomically effective shape and key board layout. An icon representing the table and its segments is located on the keyboard, and the keyswitches are arranged with respect to the icon to facilitate rapid and accurate visual identification of keys which operate particular table segments.

5 Claims, 7 Drawing Sheets

PENDENT WITH SAFETY FEATURES FOR PATIENT HANDLING APPARATUS

BACKGROUND OF THE INVENTION

1. Field of the Invention

This application relates to means for controlling a patient handling apparatus, and particularly means for adjusting the position of a surgical table.

2. State of the Art

Adjustable beds, surgical tables and patient transport tables which have means for tilting portions of the table or bed, for raising and lowering the table, etc., are in wide use in hospitals and other medical facilities. Examples of adjustable surgical tables include products marketed by Stierlen-MAQUET AG of Rastatt as BETASTAR Mobile Universal Operating Tables, by MDT Corporation of Rochester, N.Y. as the CASTLE/SHAMPAINE 4900 Series Tables, by AMSCO (American Sterilizer Co.) of Erie, Pa. as QUANTUM Surgical Tables, and by Skytron, Inc. of Grand Rapids, Mich. as SKYTRON 6500 ELITE SERIES Surgical Tables.

Generally, the above-identified adjustable surgical tables are furnished with hand-held pendants for a user to trigger movement of the table to a new position or configuration. These pendants are typically rectangular in shape, and often sufficiently large that when hand-held, both hands are required to operate the pendant. That is, as shown in FIG. 8 depicting a prior art pendant, the dimensions of the pendant are such that the fingers of the hand in whose palm the pendant rests do not easily reach the keys, especially for persons with smaller hands. Instead, the user must use the other hand to press the keys. Further, such pendants are typically provided with a clip for removably mounting the pendant to the table. However, many conventional clips do not easily allow the pendant to be rotated upward or about a vertical axis to a position where the pendant face carrying the keys is more easily viewed.

Furthermore, there are some potential hazards associated with the use of such pendants. These include, but are not limited to, medical personnel tripping over an electrical cord attached to a pendant which is clipped to a table, perhaps damaging the electrical connections of the pendant; undesired triggering of table movement by inadvertent contact with a key on the pendant; and mistakes in selecting the desired key on the pendant in poor lighting or low-light conditions.

Accordingly, there is a need for a pendant for controlling adjustable surgical tables, which provides safety features to avoid the above hazards. There is also a need for such a pendant which is configured for comfortable and accurate single-handed operation. There is further a need for a control pendant having a table-clip mechanism which will allow the pendant to breakaway in response to excessive strain on the cord.

SUMMARY OF THE INVENTION

The invention comprises a pendant for adjusting the positions of one or more segments of a multi-segment patient support table, the pendant having improved safety and handling features. The pendant has a housing with signal means disposed thereon, the signal means being operably constructed for a user to input a signal. Control means is disposed within the housing, communicatively connected to receive signals from the signal means (for example by electrical wiring, infrared signals, or the like) and operably connectable, as by electrical wiring, to at least one operating mechanism for adjusting the position of a segment of a patient table. Display means is disposed on the housing for providing the user with a display including an icon indicating the table and its segments.

The pendant is desirably provided with means for positive control of the supply of power to the table operation switches (that is, all of the switches which affect the configuration or position of the table). By interrupting power to the table operation switches either at the user's discretion, and/or automatically if a preset interval elapses during which no witches are operated, the positive control means helps prevent unintended or accidental operation of the pendant resulting in unwanted movement of the table. The safety of use of the apparatus is thus enhanced, and the likelihood of errors requiring re-positioning of the table is reduced. Further, by thus controlling the supply of power to the panel an increase of at least 5% in average battery lifetime is achieved.

The pendant has a housing with a front face, the signal means being disposed on the front face, and the housing including a grip portion dimensioned such that when held in a palm of a user's hand, fingers of that same hand extend sufficiently about said housing to reach the signal means. Desirably, the housing also includes an expanded display portion wherein the front face is of larger width than in the grip portion. The display portion has icon means disposed thereon for visually depicting the table segments in relation to the patient, and the larger width of this display portion is to provide for easy viewing of the icon means. The pendant thus constructed, shaped, and dimensioned has an ergonomically effective, anthropometrically dimensioned shape which permits handheld, one-handed operation of the signal means. Further, the keyboard layout of the pendant, that is, the arrangement of the switches, and the format of the icon means, are also designed with ergonomic and anthropometric principles relating to processing of visual information. The display includes switch icons for each switch, indicating which of a plurality of table segment movements or configurations is being selected and interpretable without reference to text definitions. Further, the pendant preferably includes integral lighting means for increasing the visibility of the display and switches in low ambient light conditions, which are preferred during endoscopic procedures, for example.

In a preferred embodiment, a plurality of segment switches for selectively moving a single segment of the table are arranged to be visually aligned with a corresponding segment in the table icon. That is, there is a visual correspondence between the placement of each segment switch and the corresponding segment of the icon representing the respective platform segment movable by operation of the switch. This design provides for a more intuitive operation by the user, and reduces the risk of selection of a switch other than the one which produces the desired adjustment of the selected segment.

Another feature is a clip mechanically associated with the pendant housing, which will allow the pendant to be articulated along at least one joint so as to be easily positioned to be visible and accessible to the operator typically standing adjacent the table. The clip preferably also has a "breakaway" construction that will allow it to release from the table when pulled with a significant force.

The invention further embraces a multi-segment adjustable patient table in combination with a pendant as described in the preceding paragraphs.

BRIEF DESCRIPTION OF THE DRAWINGS

In the drawings, which illustrate the best mode presently known of carrying out the invention.

DETAILED DESCRIPTION OF THE ILLUSTRATED EMBODIMENTS

Figure 1:
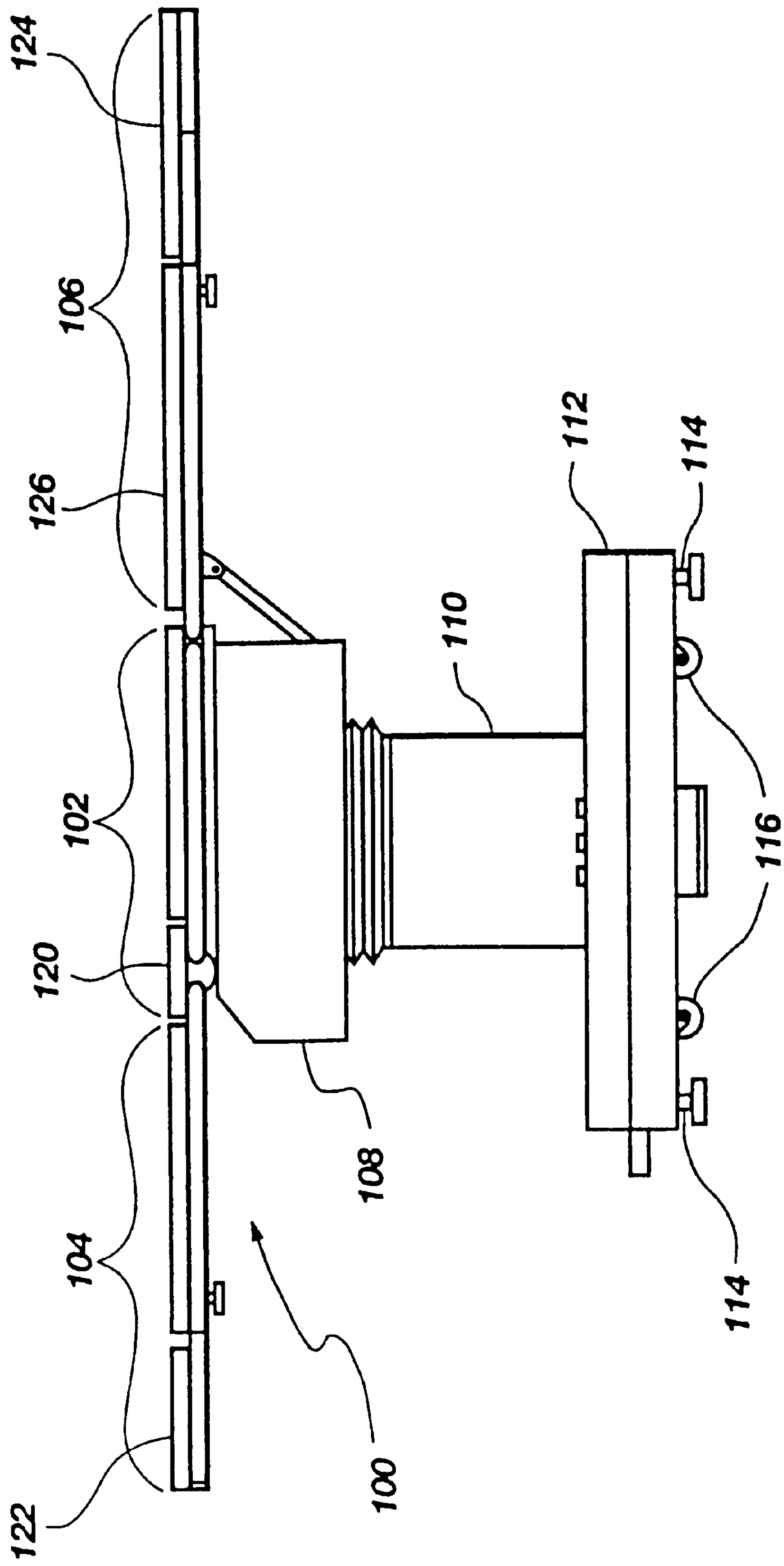
FIG. 1 is a side view of a patient table with independently movable segments, for which the control pendant of the invention is useful.

Referring to FIG. 1, a segmented patient table of the kind used in medical settings is shown. As used in describing the present invention, the term "patient support table" or "patient table" is intended to encompass not only surgical and patient examination or treatment tables, but also patient beds such as may be used in both home and institutional settings. A patient table of this invention comprises a platform indicated generally at 100 having a main support 108 and three independently movable main segments: center segment 102, back segment 104, and leg segment 106. Main support 108 is slidably mounted and supported on a column 110. In this embodiment, column 110 is itself supported on a base unit 112 having feet 114 and wheels 116. Desirably, a kidney elevator segment 120 is provided for raising and lowering the kidney region of a patient lying on the platform. A headrest piece 122 is removable, and forms part of the back segment 104. Leg segment 106 also includes a removable segment 124.

Figure 2:
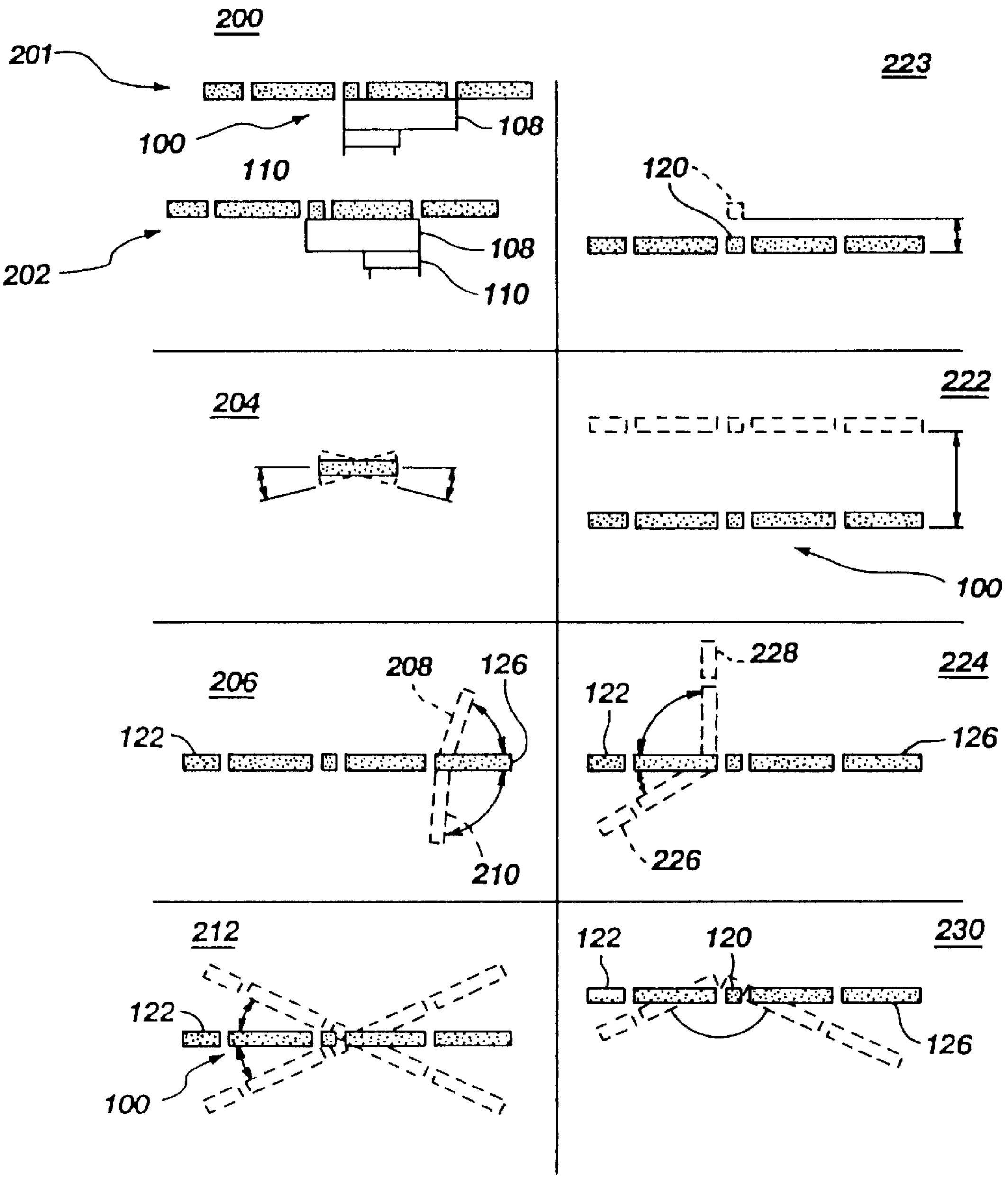
FIG. 2 depicts in schematic form a series of position changes of the movable segments of the patient table of FIG. 1, these position changes being controllable by the pendant of the invention.

The movements of which the segments 102, 104, 106 and kidney elevator 120 are capable, and selected useful configurations in which the patient table may be placed, are better understood with reference to FIG. 2. FIG. 2 is arranged in tabular format, and includes blocks designated 200, 204, 206, 212, 220, 222, 224, and 230 respectively. Removable segment 124 is not shown in the schematic blocks of FIG. 2. The leg segment 106 is represented by one of its segments, 126. Block 200 shows the sliding of the entire platform unit 100 relative to the main support 108, to forward 201 and reverse 202 positions respectively. Block 204 depicts the platform as seen from one end looking lengthwise along the platform segments, and schematically shows the tilting of the platform to the left and to the right about such a longitudinal axis. Block 206 depicts leg up 208 and leg down 210 positions of the leg segment 126.

Block 212 depicts tilting of the entire platform about an approximately central axis, this central axis being at right angles to the longitudinal axis for "tilt" of diagram 204. Such lengthwise angling of the table is commonly termed trendelenburg or reverse trendelenburg, depending on whether the patient's head is at the elevated end of the platform or at the lowered end of the platform. Block 220 depicts movement of the kidney elevator 120 to a "kidney up" position, in which the kidney elevator segment is a few (generally 3–6) inches above the remaining segments of the table. Block 222 depicts the translocation of the entire platform vertically up and down along an axis parallel with the column 110. Block 224 depicts the back segment 104 including the headrest 122 being movable over a range from a "back down" position 226 with the back segment 104 below the remainder of the platform and a "back up" position 228 with the back segment 104 above the remainder of the platform.

Block 230 depicts a "flex" position in which segment 104 is tilted downward to one side, and segments 102 and 106 are tilted downward to the opposite side, of kidney elevator 120. The platform can also be placed in an opposite or reflex position with the indicated segments tilting upward to either side of kidney elevator 120 (not shown).

Figure 3:
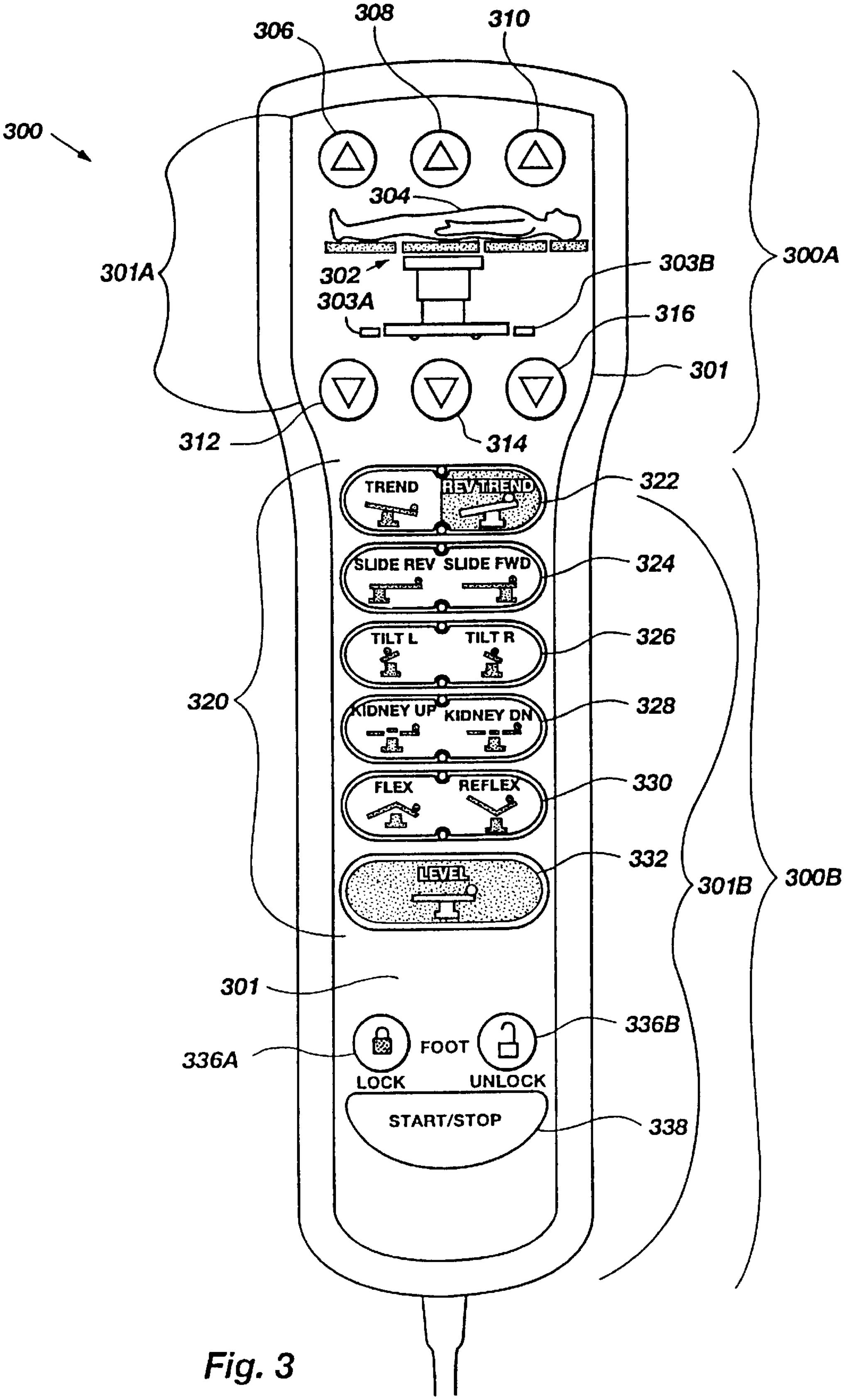
FIG. 3 is a front view of a switch panel and graphic display of an embodiment of a control pendant of the invention.

As seen in FIG. 3, a control pendant useful to control the segmented table of FIGS. 1 and 2 has a housing indicated at 300 with a display panel 301 on its front face. The housing 300 has a lower portion 300B and an upper portion 300A which is wider and may also be deeper than the lower portion. Lower portion 300B is shaped and sized to fit comfortably in a user's hand with the digits extending to both sides sufficiently to reach the keys and other signal and display elements to be described subsequently. The display panel 301 has upper 301A and lower 301B portions corresponding to the upper 300A and lower 300B portions of housing 300. The 300 housing is shaped, and the keys, switches and display elements are arranged on the panel 301, in accordance with ergonomic principles for providing efficient, accurate and comfortable one-handed hand-held use.

An icon indicated generally at 302 representing the patient table having movable segments, which is to be controlled by the pendant, is located on the upper portion 301A of the display panel 301. In this location the icon 302 is not likely to be visually obscured by the user's hand or fingers. A second icon 304 represents a patient lying supine on the patient table.

A set of three keys 306, 308, 310 each marked with an up-facing arrow or triangle shape are disposed above the icons 302, 304. Keys 306, 308, 310 are spaced so that one key is approximately above each of three main segments indicated in the patient table icon 302. Keys 306, 308, 310 are operably connected to move their respective adjacent table segments in an upward direction. A second set of keys 312, 314, 316, each marked with a down-facing arrow or triangle, are disposed below and adjacent respective table segments of the icon 302; keys 312, 314, 316 are also spaced to be more or less directly below keys 306, 308, 310, respectively, and are connected to move the corresponding platform segment downward.

Below the second row of keys is an array 320 comprising six biposition switches. The array is preferably designed as a vertical column of biposition switches.

In the presently preferred embodiment, the trendelenburg switch 322 is at the top of the array, as the trendelenburg movement is one of those most often used in an emergency situation. Immediately below the trendelenburg switch 322 is a slide switch 324 which controls sliding of the table top back and forth on a horizontal line over the table support column. Pressing the left side of slide switch 324 generates a signal which produces leftward movement of the platform, while pressing the right side of slide switch 324 causes rightward translation of the platform. The slide switch 324 has a text label and preferably additionally icons which depict the platform moved to the left and to the right disposed on the appropriate respective portions of the biposition switch.

A tilt switch 326 is below the slide switch 324, and similarly has left and right sides which signal the movement means to tilt the entire table about a longitudinal axis to the left or the right. A text label and a pair of icons depicting the direction of tilt produced are disposed on the respective appropriate ends of the tilt switch.

A kidney switch 328 is disposed below the tilt switch, and controls the displacement of the kidney elevator 120 up or down vertically with respect to the other platform segments. The left side of kidney switch 328 shifts the kidney segment downward, while the right side shifts the kidney segment upward. A text label and a pair of corresponding icons are disposed on kidney switch 328 similar to switches 324, 326.

A flex/reflex switch 330 is located below the kidney switch 328, and controls tilting of the main platform segments to either an upward facing "V" configuration or a downward facing "V" configuration as shown.

A "return to level" switch 332 is located at the lower end of array 320, below the flex switch 330, and is operable to initiate the movement of all the platform segments to a starting horizontal position. In a highly preferred embodiment, the return to level switch 332 initiates a selected movement sequence in which individual segments are moved so as to avoid harming or unduly distorting the position of a patient resting on the platform, to achieve the horizontal starting position. The Return to Level switch is operable only in a binary manner.

As the trendelenburg switch 322 is one of those most frequently used in emergency situations, it is desirably visually enhanced relative to the other switches, for example by being differently colored. Optionally, the "return to level" switch 332 may be colored or otherwise visually enhanced to distinguish it from other keys.

The positions depicted in FIG. 2 correspond as follows to the keys of the pendant of FIG. 3: Slide key 324 to move the platform 100 and platform mount 108 as shown in block 200; tilt key 326 operates the platform as shown in block 204; kidney key 328 operates the kidney elevator as shown in block 220; flex key 330 operates the segments 302, 304, 306 as shown in block 230; and trend key 322 operates the platform 100 as shown in block 212. Further, keys 306 and 312 operate segment 106 as shown in block 206; keys 310 and 316 operate segment 104 as shown in block 224. Finally, keys 308, 314 operate respectively to raise or lower the platform 100 together with the mount 108 as shown in block 222.

Below the array 320 is another pair of keys 336A, 336B which control the locking and unlocking of the feet of the table. Key 336A places the table feet in a locked (inmovable) condition, while key 336B places the table feet in an unlocked (movable) condition. Preferably, keys 336A, 336B have respective icons depicting a lock mechanism such as a padlock in locked and unlocked states.

Other switches, such as an orientation switch for adjusting all switches on the pendant to control protocols appropriate for circumstances in which the actual patient orientation on the table is the reverse of that depicted by icon 304, or to control additional features of the table, may be disposed on the pendant as desired.

Figure 4:
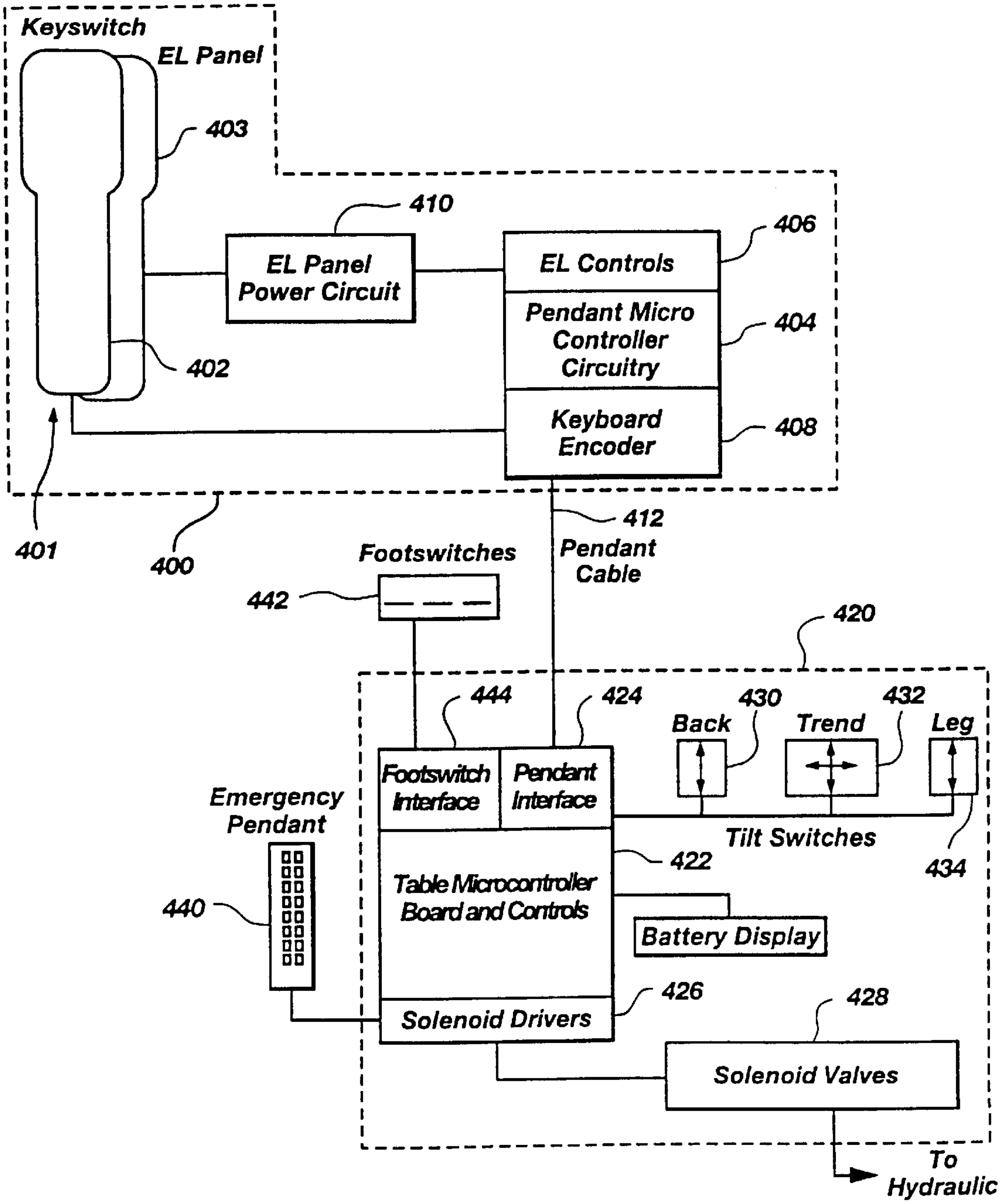
FIG. 4 is a block diagram depicting the control components of the pendant of FIG. 3 and the corresponding control components of the table of FIG. 1.

Finally, the display panel 301 includes a Start/Stop switch 338 which provides positive control of the supply of power to the other switches on the panel. In the present embodiment, the Start/Stop switch 338 is a binary switch connected to the EL panel power circuit 410 (FIG. 4). When the Start/Stop switch is pressed, the remaining switches are connected via the power circuit 410 to receive power, thereby rendering them operable. Pressing the Start/Stop switch a second time causes the other switches to be disconnected from power, thus deactivating them.

In a highly preferred embodiment, the first pressing of the Start/Stop switch 338 activates a timing means to time a preset interval. If no keys are operated during this interval, power to the switches is automatically terminated at the end of the interval. If any switch is operated within the interval, the timer is restarted. This sequence continues, and power is continuously supplied to the other switches, until either a complete interval lapses without operation of any switches, or the Start/Stop switch is pressed again.

In a highly preferred embodiment of the display panel 301, means for backlighting the switches are provided behind the display panel 301. Such backlighting provides a user with enhanced visibility and improved discrimination among the switches, especially under low light conditions. In a presently preferred embodiment, the means for backlighting is an EL (electroluminescence) panel comprising a film of a phosphor which glows when an alternating current is applied (see FIG. 4). As known in the art, EL panels provide an easily-manufactured thin film offering uniform lighting over the whole surface. While EL panels are preferred over LEDS, conventional filament-based light sources, or other known backlighting means, any of the latter group of light sources could also be used.

In a still further preferred embodiment, the Start/Stop switch 338 also controls the supply of power to the backlight, such that the backlight is deactivated when power to the switches is interrupted. Thus, a user can easily see whether the keys are operable or not.

In the presently preferred embodiment of the panel shown in FIG. 3, the switches are arranged such that all of the switches can be readily reached and operated by a user holding the pendant in one hand and operating the switches with the digits of the same hand. Further preferably, the switches are arranged so that the most frequently used switches are the most easily reached. The arrangement of keys, switches and icons also facilitates viewing of the table simultaneously with viewing and operation of the pendant. Further, the placement and use of the visual symbols to indicate the function of each switch facilitates "intuitive" operation of the switches by a user, which decreases both the time required to place the table and patient in a desired configuration and the frequency of error during the process of such placement.

As seen in the block diagram of FIG. 4, the control pendant 400 includes a housing 401 with a switch panel 402 forming one surface thereof, and an EL panel 403 located behind the switch panel. A pendant microcontroller 404, relays 406, and pendant keyboard encoder 408 are disposed within the housing. Also within the housing is a power circuit 410 which is connected between the switch panel 402 and the relays 406. The power circuit 410 is connected to the Start/Stop switch 338, and configured to effect connection and disconnection of the supply of power to the table movement keys and the EL panel as described previously with regard to the switch 338. A pendant cable 412 electrically connects the control pendant to a table control means 420 of a surgical table.

A table control means 420 is operably associated with the table 100, and includes a table microcontroller 422, a pendant interface 424, and solenoid drivers 426. Pendant interface 424 connects the table microcontroller 422 to the pendant keyboard encoder 408 via a two-wire communicative linkage (pendant cable 412). The table microcontroller 422 provides a signal output to solenoid drivers 426, which are in turn connected to solenoid valves 428. The solenoid valves 428 are operably connected to a hydraulic drive (not shown) which provides the motive force for movements of the patient table and of its individual segments. The pendant interface 424 is also connected to tilt switches 430, 432, 434 which signal the hydraulic drive to move all the table segments together to achieve a tilt or trendelenburg configuration.

Optionally, an emergency pendant 440 is connected to the solenoid drivers 426 to operate the solenoid valve-actuated hydraulic drive. Also optionally, foot switches 442 are connected via a footswitch interface 444 which interfaces with the table microcontroller 422. The foot switches 442 and emergency pendant 440 provide alternate and redundant means for controlling the movement of the patient table and/or its segments. The emergency pendant is located and configured to be useful particularly in the case that the table microcontroller 422 and/or the control pendant 400 are disabled in some manner.

In general, in the illustrated and presently preferred embodiment the pendant microcontroller 404 is constructed to direct the operation of features associated with the pendant, such as initiating the supply of power to the keys and the automatic shut-off. Conversely, the table microcontroller 422 is constructed to process the input from the sensors which report the positions of the table segments, and to control the hydraulic drive and the sequence in which individual segments are adjusted to achieve a particular table configuration. (Simultaneous movement of all segments to move from one configuration to another, or movement of individual table segments in inappropriate order, may cause damage to the table or discomfort or injury to a patient.)

Alternatively, it would be possible to locate the keyboard encoder 408 and most or all of the functions described for the pendant microcontroller 404 in the table microcontroller 422. In such an embodiment, the table control means 420 would be further provided with a plurality of relays (not shown) corresponding to the keyswitches, and a corresponding number of wires would be encased in the pendant cable 412 to communicatively connect the keyswitches to the relays. The relays would be communicatively connected through the encoder 408 to the table microcontroller 422. However, by providing both the pendant and the table with respective microcontrollers, the need for a set of relays in the table control means to correspond to the pendant-mounted switches is eliminated, and in turn the size of the pendant cable 412 and the number of individual wires carried in the cable. For that reason, the embodiment of FIG. 4 is preferred.

In another alternate embodiment, the pendant could be constructed to function as a remote, by infrared (IR) signals, as known in the art. In such an embodiment, many of the pendant microcontroller functions would be shifted to the table microcontroller, more or less as described in the preceding paragraph.

The construction and implementation of the components of the pendant and table shown in the block diagram of FIG. 4 will be apparent to one of ordinary skill.

Highly desirably, the pendant has a clip for removably mounting the pendant to the patient table. The preferred embodiment includes two spring-loaded mounting assemblies, the first assembly providing rotation in one dimension and the second assembly providing rotation in a second dimension which is approximately normal to the first dimension. The pendant clip thus permits the user to easily orient the display-and-key surface of the pendant to face upward and/or to face towards either end of the patient bed, for easy viewing with the pendant still attached to the bed. The user's hand is thus free to move from the pendant to other operations in a quick and convenient manner.

Figure 5:
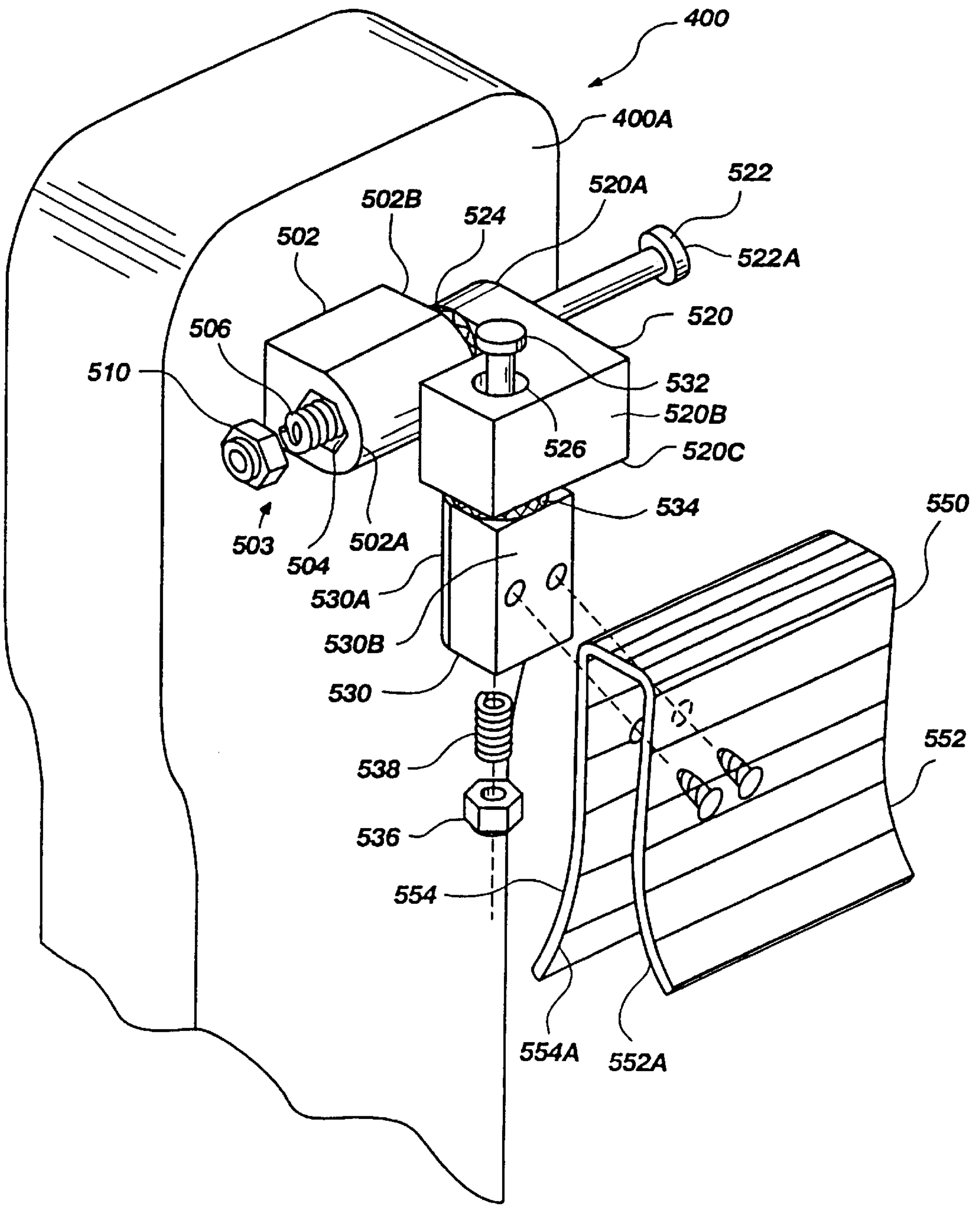
FIG. 5 is an elevational, partially exploded view of a pendant clip of the invention.

As seen in FIG. 5, a first mounting block 502 is mechanically mounted to the rear side 400A of the pendant 400. A second block 520, which comprises a convex segment 520A and a box-shaped segment 520B extending at approximately a right angle to one another, is rotatably affixed to the end 502B of block 502 by a spring-loaded friction mounting (generally indicated 503). The rotatable friction mounting of block 502 to block 520 permits the pendant to be rotated 90° in either direction with respect to block 520, from the position shown in FIG. 5. The friction fitting-spring mounting assembly also provides that the pendant will be frictionally held in a selected position until sufficient rotational force is applied to urge it to another position, where it will then be similarly held.

In the embodiment of FIG. 5, the rotatable friction mounting 503 includes a channel 504 extending through block 502, which is hexagonally shaped to snugly receive a nut 510. Block 502 also has a convex portion 502A, having an arc of curvature approximately centered on the linear axis of the channel 504. An elongated screw member 522 is rotatably disposed in a channel (not seen) that extends through segment 520A of block 520, in registration with channel 504. The distal end (not shown) of screw member 522, which is threaded, passes through the channel 504 and screws into the nut 510. A spring 506 is disposed in channel 504 parallel to screw member 522 and exerts tension tending to push blocks 502 and 520 apart. A spline fitting 524 is disposed between the adjacent surfaces of blocks 502 and 522. The convex surface of convex segment 520A is disposed adjacent and in light contact with rear surface 100A; the contact is not so great as to prevent rotation of block 520 about the axis of the screw member 522.

The proximal end 522A of screw member 522 may be configured in several ways to facilitate attachment to the nut 510. The proximal end 522 may be configured with a hexagonal depression for snugly receiving an Allen wrench, in which case the screw 522 is tightened by means of an Allen wrench. In such an embodiment, when the screw member is mated with nut 510, the proximal end 522A may be counter-sunk into the block 520. In another embodiment, the proximal end 522A may be provided with cross-shaped grooves for receiving a Phillips-head-type screwdriver. In this case, the opening may be configured to permit the end 522A to be seated flush (flat-head screw type) or to sit above (round-head screw type) the surface of the block 520. In still another embodiment, the proximal end 522A may be provided with a milled wheel to serve as a thumbscrew, which extends above the surface of the block 520 in its tightest position. In still another embodiment, the distal end of the screw member is fixed to the nut 510, proximal end 522A is threaded and a wing nut tightens the assembly. Still other configurations of the screw member 522 for tightening against the spring and the spline fitting will be apparent to those of ordinary skill.

Figures 6, 7:
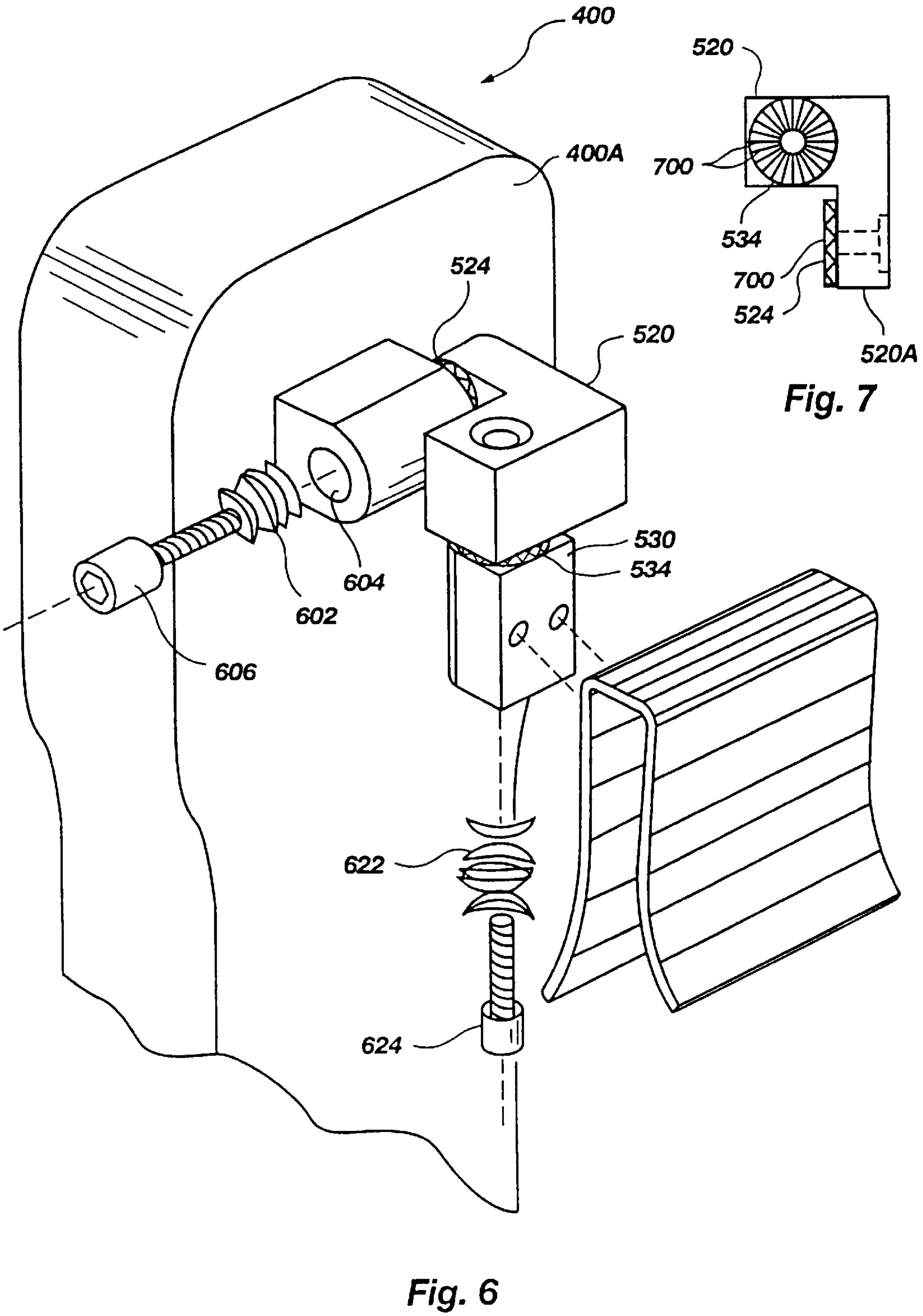
FIG. 6 is an elevational, partially exploded view of an alternate embodiment of the pendant clip.
FIG. 7 is a plan view detail of block 620 with the friction assembly of FIG. 6.

In an alternate and presently preferred embodiment of a rotatable friction mounting assembly, the spring 506 (illustrated in FIG. 5) is replaced by a series of stack or Belleville spring washers 602 disposed in an opening 604 of curved rather than hexagonal geometry, and the screw member 522 is replaced by a socket head cap screw 606 (FIG. 6). This arrangement provides increased spring force and better holding of the pendant over the rotational range of the coupling. Also preferably, the number of detent serrations 700 on the spline fitting 524 is sufficient, and the height of the serrations is sufficient, to hold the clip in a selected orientation, but not so great as to require excessive force to shift the pendant to a new angle. The screw 522 or 604 should be sized to provide a bearing surface and strength sufficient to support the pendant weight at various angles. If desired for further improved holding performance, LOCTTTE or a nylon locking patch can be applied to the threaded regions of the adjustment screws after assembly. Alternatively or additionally, a locking-type threaded insert in the block 502 could be used to help hold the screw 522 or 604 in position.

FIG. 7 shows block 520 with the friction bushings 524, 534 in greater detail.

Referring to FIG. 5, in a highly preferred embodiment, a third block 530 is rotatably mounted to the second block 520 so as to permit rotation of the pendant about a second axis which is disposed at approximately right angles to the first axis. The mounting assembly is similar to that described for the mounting of block 520 to block 502. The block 530 has a convex surface 530A and a flat surface 530B disposed opposite each other, and is rotatably mounted to the underside 520C of the box-shaped segment 520B. A second screw member 532 is rotatably disposed in a channel 526 which extends through segment 520B and registers with a corresponding channel (not seen in FIG. 5) in block 530. A nut 536 and spring 538 are seated in this corresponding channel, and screw member 532 has a threaded distal end which mates with nut 536. A second spline bushing 534 is disposed between the adjacent faces of blocks 520 and 530. In a manner similar to that described in the preceding paragraph and shown in FIG. 6, in a preferred embodiment a series of Belleville washers 622 and socket head screw 624 are substituted for the screw 532/spring 538/nut 536 arrangement.

A clip 550 (FIG. 5) is mechanically affixed to the flat surface 530B of block 530 by any suitable means. The clip 550 is positioned on surface 530B so as not to interfere with rotation of block 530 about the long axis of screw member 532. Clip 550 is configured approximately as a U-shape to slip over a railing or bar. The clip is desirably made of a semi-rigid material, either metal or plastic, whose resiliency is sufficient to allow the leg segments 552, 554 to be slightly spread apart to exert tension toward an object placed between them. The legs 552, 554 may also be shaped to give the clip a "waist", or central region which is slightly narrower, to help retain the clip on the rail once it is snapped into place. Desirably, the outer ends 552A, 554A respectively of the legs are slightly flared to facilitate sliding the clip over the rail.

From FIGS. 5 and 6, it is apparent that the second mounting assembly permits the pendant to be rotated to either the right or the left of the depicted position, with the extent of rotation being limited only as it impacts the clip and/or the railing on which the clip may be mounted. If the pendant is rotated about the first screw 522 to face upwards, the pendant can be then rotated through 360° with respect to block 530 and the clip 550.

It will be apparent that other types of friction mounting assemblies could be designed by one of ordinary skill for rotatably adjustable mounting of blocks

502, 520 and 530 to each other.

Figure 9:
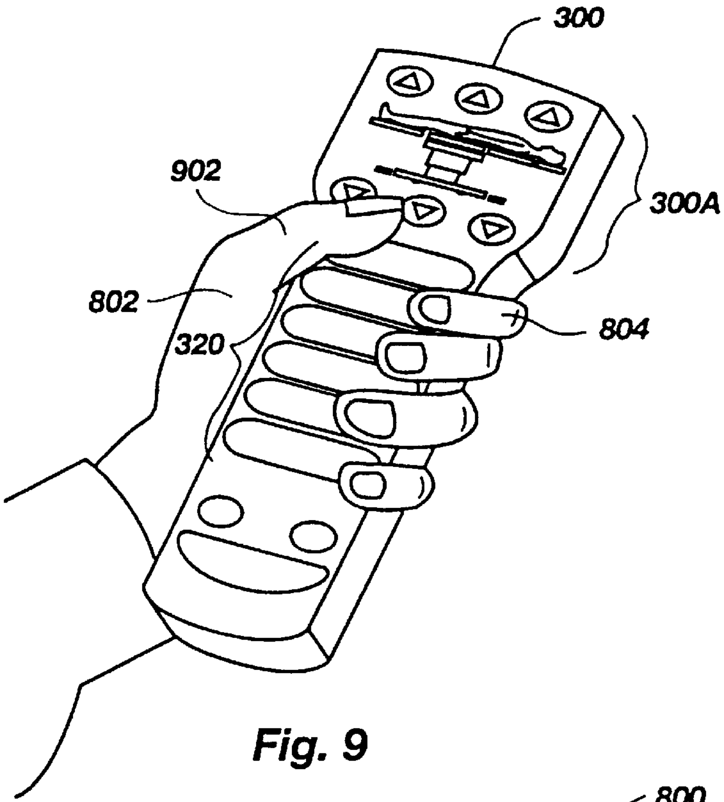
FIG. 9 depicts a control pendant of the invention approximately to scale.
Figure 8:
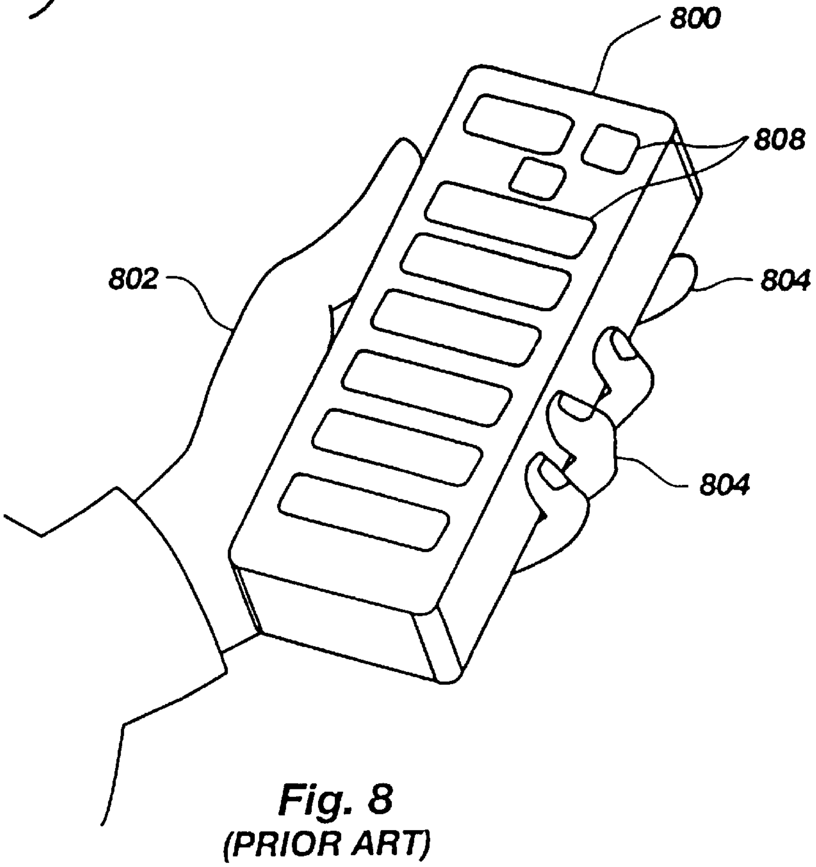
Fig. 8 (PRIOR ART)
FIG. 8 depicts a prior art control pendant approximately to scale, as taken from a photograph in a brochure concerning the QUANTUM 3080RC surgical table.

FIG. 8 depicts a prior art pendant 800 as held in a user's hand 802. It is apparent that the user's fingers 804 can reach the keys 808 with difficulty, if at all. In contrast, as seen in FIG. 9, the pendant 300 of the invention is shaped and dimensioned such that both the fmgers 804 and the thumb 902 can reach the keys, especially those of array 320.

It will further be apparent that various modifications, both additions and deletions to the illustrated embodiments, can be made without departing from the scope of the invention as defined in the following claims.

What is claimed is:

1. A pendant for operating a patient support table having one or more segments operably associated with drive means for adjusting the position of the segments, comprising:

a housing;

control means disposed within said housing, communicatively connectable to the drive means of the medical table, and constructed to output control signals for controlling the position of the segments to produce a plurality of configurations of the table;

signal means disposed on said housing and communicatively connected to said control means for a user to signal said control means to produce control signals corresponding to desired changes in position of the segments;

positive power control means connected to said signal means, for connecting and disconnecting said signal means from a power source, and wherein said housing has a front face with said signalling means disposed thereon, and said housing includes an handgrip portion dimensioned such that when held in a palm of a user's hand, fingers of said hand extend sufficiently about said housing to reach said signal means, thereby providing hand-held single-handed operation of the pendant.

2. The pendant of claim 1, wherein said positive power control means is further configured to disconnect said signal means from said power source upon lapsing of a preset interval during which said signal means is not operated by a user.

3. The pendant of claim 1, further including icon means disposed on said housing front face for visually representing the table segments in relation to the patient, said icon means including a plurality of icon segments each visually corresponding to one of the movable table segments, and wherein said signalling means includes a plurality of segment switches each located adjacent one of said icon segments and operable to move said corresponding movable table segment.

4. The pendant of claim 3, wherein said icon is positioned on said housing front face above said handgrip portion for viewing unobscured by said user's fingers.

5. A pendant for operating a patient support table having one or more segments operably associated with drive means for adjusting the position of the segments, comprising:

a housing;

control means disposed within said housing, communicatively connectable to the drive means of the medical table, and constructed to output control signals for controlling the position of the segments to produce a plurality of configurations of the table;

signal means disposed on said housing and communicatively connected to said control means for a user to signal said control means to produce control signals corresponding to desired changes in position of the segments;

positive power control means connected to said signal means, for connecting and disconnecting said signal means from a power source, and backlighting means operably disposed in said housing for providing local illumination of said signal means.

* * * * *